May 12, 1925.
F. X. LAUTERBUR
DOUGH MOLDING MACHINE
Filed June 14, 1921
1,537,613
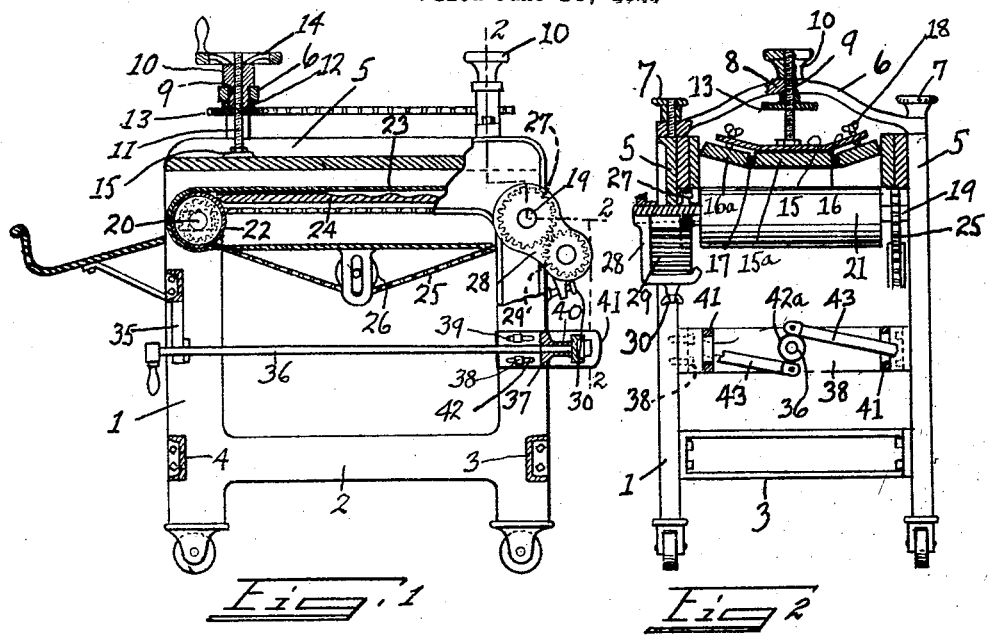
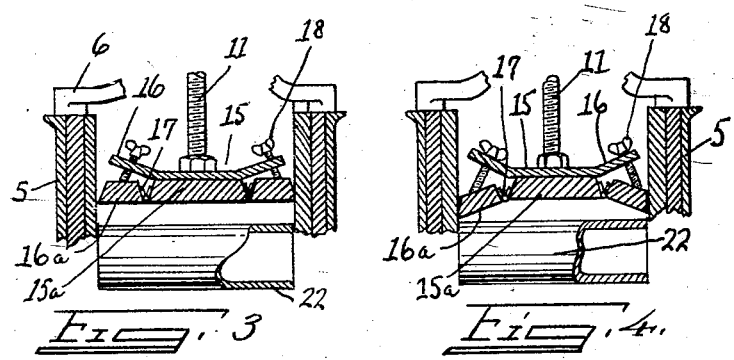
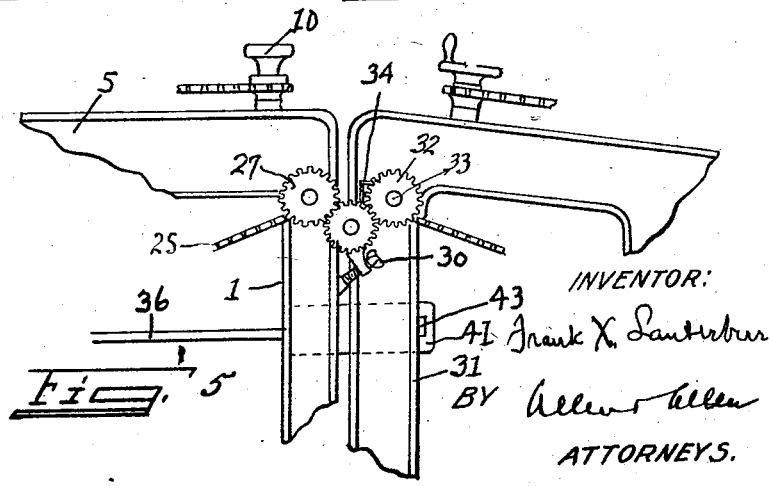
INVENTOR:
Frank X. Lauterbur
BY Allen + Allen
ATTORNEYS.

Patented May 12, 1925.

1,537,613

UNITED STATES PATENT OFFICE.

FRANK X. LAUTERBUR, OF SIDNEY, OHIO.

DOUGH-MOLDING MACHINE.

Application filed June 14, 1921. Serial No. 477,363.

*To all whom it may concern:*

Be it known that I, FRANK X. LAUTERBUR, a citizen of the United States, and a resident of Sidney, in the county of Shelby and State of Ohio, have invented certain new and useful Improvements in Dough-Molding Machines, of which the following is a full, clear, and exact description, reference being had to the accompanying drawings, forming part of this specification.

My invention relates to dough molding machines and more particularly to attachments therefor which form extensions of the kneading elements of such machines.

In my Patent No. 1,167,187, dated January 4, 1916, I describe a form of dough molding machine and its action, and in a co-pending application for patent Serial No. 477,080, filed June 13, 1921, now Patent No. 1,432,874, I describe a similar machine having various adjustments, same being of particular interest in connection with the adjustment of the conveyor belt, as will be noted below.

The object of the present invention is to provide an extension unit which can be quickly and positively attached to a kneading box in such machines as in said patent and application for patent, whereby additional kneading may be imparted to the roll or coil of dough, said unit to be driven by the power means for the machine to which it is attached.

Another object of my invention is to provide this extension unit with means for varying the shape of a roll of dough by making its ends smaller or larger than its central portions.

Another object is to provide for driving mechanism for the extension, which can be adjusted to mesh with the conveyor belt drive of the main machine, no matter what adjustment is made in the said belt drive.

These objects and other advantages to be noted I accomplish by that certain construction and arrangement of parts to be hereinafter more specifically pointed out and claimed.

In the drawings,

Figure 1 is a longitudinal section of the device partly in elevation.

Figure 2 is a section on the line 2—2 of Figure 1.

Figure 3 is a detail section taken through the pressure board showing a different position from that in Figure 2.

Figure 4 is another like view showing a third position of adjustment of the pressure board.

Figure 5 is a side elevation showing the unit in attachment to the built-in kneading unit of one of my machines.

I have indicated at 1 the side standards of the extension unit kneading device, same having lower side cross pieces 2, a front cross piece 3, and a rear cross piece 4, and bed forming top pieces 5.

Set on the top bars or bed are a pair or more of arched straps 6, which are held in place by means of bolts 7, so that they straddle the machine. These straps have central bosses 8, which journal sleeves 9 having suitable heads 10.

The sleeves are internally threaded to receive the screw posts 11, which support the pressure board and are non-rotatably secured to said board, whereby the revolution of the sleeves will feed the screws along and adjust the position of the board.

The sleeves have collars 12 thereon, and also sprockets 13, said sprockets being connected by a chain, whereby the sleeves are held against reciprocation in the bosses and the revolution of one sleeve will cause the other to revolve in a like manner.

The one sleeve may have a hand wheel 14 for easy operation and by means of the structure described a uniform plan for the position of the pressure board is assured at all times.

The screw posts are rigidly secured to the board supporting plates 15, which are formed with upturned sides 16, as shown. The pressure board proper is formed of a central section 15$^a$ secured fast to the supporting plates and two side sections 16$^a$ hinged to the central section.

The hinges 17, which accomplish this structure, are equipped with springs adapted to close them and bring the side pieces to the position shown in Figure 2, such that the main portion of the board is lower than the two side pieces.

Wing bolts 18 are set in the turned-up sides of the supporting plates, which bolts bear on the hinged portions of the side board, so that a variety of positions can be obtained illustrated by Figures 2, 3, and 4, whereby the lower surface of the pressure board may be in a single plan as in Figure 3 or a semi-convex form as in Figure 2 or a semi-concave form as shown in Figure 4.

Set in the front and rear of the machine are shafts 19 and 20, which carry rolls 21 and 22, over which passes a conveyor belt 23. The space intermediate the two conveyors may be taken up by any suitable kneading board 24 (see my patent above referred to) which presents to the conveyor a corrugated supporting surface. Thus when rolls of dough are engaged by the conveyor and caused to travel through the machine, they will be pressed down against the conveyor by the pressure board and will receive the kneading action imparted by the kneading board and at the same time will be given the proper taper at the ends or toward the middle that may be found desirable.

The shaft 19 is the driving shaft for the conveyor device and has a sprocket thereon to drive a chain 25, which engages over a sprocket on the shaft 20. This chain is tensioned by an adjustable idler sprocket 26.

The shaft 19 has on the inside of the frame a gear 27 fast thereon, and on the outside of the frame is hung a casing 28, which journals a wide gear 29. The gear 29 may be swung by the frame about the axis of the gear 27, so that it will drive the shaft 19 from a variety of positions. A wing bolt 30, held in a lug on the casing, engages the side frame of the extension unit, and by adjustment of the bolt, the position of the casing and hence of the wide gear 29 may be readily adjusted.

In the machine of my patent and more particularly of my application for patent, the main or kneading frame parts 31 are provided with conveyor driving means, terminating in a sprocket 32, adjustable together with its shaft 33 in sliding journal boxes 34.

By means of my planetary gear device above described, a variety of adjustments can be compensated for when the extension unit is secured to the main kneading frame parts by the raising or lowering of this wide gear.

As a securing device for my separable unit, I provide a bracket 35 at the rear of the unit for the journaling of a rock shaft 36. At the front of the machine a cross bar 37 is mounted by means of bolts 38 engaging the frame standards and passing through slots 39 in the cross bar. The shaft passes through this cross bar and can move lengthwise with the cross bar when it is adjusted on its slotted mounting.

The cross bar has a central boss 40 through which the shaft passes, and also two projecting arms 41, 41, which are transversely pierced with slots 42. The shaft has a head 42$^a$ on its end to which are pivoted two locking rods 43.

The arms 41 extend inside of main frame 31 to which my device is to be attached in such a way as to snugly fit inside the two rearmost vertical standards thereof, and by rocking the shaft, the locking rods can be swung so as to slide in the slots 42. This will bring the ends of the rods 43 across the frame parts 31, thereby firmly clamping the two frames together without in any way requiring attachments on the frame of the molding machine proper.

The rolls of dough will pass from the machine proper to the extension unit and there be given such further treatment as necessary, and the unit can be quickly and firmly attached so as to be driven from the machine proper.

I have not attempted to show in great detail some of the parts of my extension unit, and the mechanic skilled in the arts involved may readily devise other corresponding structures for accomplishing the various features of my invention without departing from the spirit thereof. I have omitted description of modified structure without any desire to thereby imply a limitation to the construction of the claims that follow.

Having thus described my invention, what I claim as new and desire to secure by Letters Patent, is:—

1. In a device of the character described, the combination with a pressure board mounting means, of a pressure board having articulated members, and means for positioning said members to provide a pressure surface lying in more than one plane.

2. In a device of the character described, the combination with a pressure board mounting means, of a pressure board having a central portion and articulated sides mounted in connection therewith, and means for positioning said articulated sides, for the purpose described.

3. In a device of the character described, the combination with suspending means for a pressure board, of supporting means on said suspending means, said supporting means lying in a plurality of planes, and a pressure board, comprising articulated members mounted on the supporting means, said supporting means having members thereon to engage the articulated portions and position them as desired.

4. In a device of the character described, the combination with suspending means for a pressure board, of supporting means on said suspending means, said supporting means lying in a plurality of planes, and a pressure board, comprising articulated members mounted on the supporting means, said supporting means having members thereon to engage the articulated portions and position them as desired, said board having a central member rigid on the supporting means and side members articulated to the central member, 5. In a device of the character described, a pressure board, comprising a central member, and side members hinged to said central member, and means for supporting the central member and for retaining the side members in desired angular relation to the central member.

6. In a device of the character described, the combination with a pressure board mounting means, of a pressure board having articulated members, and means for positioning said members to provide a pressure surface lying in more than one plane, said supporting means being adjustable for length so as to position the pressure board in desired position with relation to a kneading surface.

7. In combination, a plurality of supporting straps in a machine of the character described, posts adjustably held in said straps, cross pieces on the ends of the posts having upturned ends, and a pressure board secured to the cross pieces, said board having side members hinged thereto, and adjustable means on the cross pieces to engage said side members of the pressure board.

8. In combination, a plurality of supporting straps in a machine of the character described, posts adjustably held in said straps, cross pieces on the ends of the posts having upturned ends, and a pressure board secured to the cross pieces, said board having side members hinged thereto, and adjustable means on the cross pieces to engage said side members of the pressure board, the hinges for the board being spring hinges, and the adjustable means on the cross pieces comprising abutments adjustable for length, as and for the purpose described.

9. In combination with a dough molding machine having a frame portion and gearing thereon, an extension unit having kneading mechanism therein, comprising gearing for driving the same, and means for securing the extension unit to the frame portion with the respective gearing thereof in mesh, a portion of the gearing for the extension unit being planetary and means for holding said planetary portion thereof in a variety of positions to insure a mesh with the gearing on the frame portion.

10. In combination with a dough molding machine having a kneading device, and gearing therefor, an extension unit having kneading mechanism therein, comprising gearing for driving the same, and means for securing the extension unit to the kneading device with the respective gearing thereof in mesh, said gearing being adjustable for the extension unit, so as to engage the kneading device gearing in a variety of positions, and said securing means for the extension unit being mounted solely on the extension unit.

11. In combination with a dough molding machine having a kneading device, and gearing therefor, an extension unit having kneading mechanism therein, comprising gearing for driving the same, and means for securing the extension unit to the kneading device with the respective gearing thereof in mesh, said gearing being adjustable for the extension unit, so as to engage the kneading device gearing in a variety of positions, and said securing means for the extension unit being adjustable to and from the unit.

12. In combination with a dough molding machine or the like, and an extension unit therefor, an attaching means for the one to the other, comprising the frame standards of each, a pair of arms on the one to lie along the frame standards of the other, and a member supported in connection with the arms and having laterally extending articulated rods or the like, adapted to engage across the said frame standards and to engage the said arms.

13. The combination with an extension unit for use in dough molding machines, a frame for said unit and for the machine, and a cross member on the unit having forwardly extending arms to lie along the frame of the machine, a rock shaft in the cross member, and rods on the rock shaft, said arms being extended to the far side of the machine frame from the unit, and means on the said arms to engage the rods upon a rocking of the shaft, and the rods adapted to engage the molding machine frame.

14. The combination with an extension unit for use in dough molding machines, a frame for said unit and for the machine, and a cross member on the unit having forwardly extending arms to lie along the frame of the machine, a rock shaft in the cross member, and rods on the rock shaft, said arms being extended to the far side of the machine frame from the unit, and means on the said arms to engage the rods upon a rocking of the shaft, said means comprising holes in the arms, said holes being adapted to receive the rods, and the rods adapted to engage the molding machine frame.

15. The combination with an extension unit for use in dough molding machines, a frame for said unit and for the machine, and a cross member on the unit having forwardly extending arms to lie along the frame of the machine, a rock shaft in the cross member, and rods on the rock shaft, said arms being extended to the far side of the machine frame from the unit, and means on the said arms to engage the rods upon a rocking of the shaft, said cross members being adapted to be adjustably secured in position in the extension unit, and the rods adapted to engage the molding machine frame.

16. In combination with a dough molding machine having an adjustable gear at one end of its frame, an extension unit for acting upon the dough treated in the machine, mechanism in the extension unit, comprising gearing to drive the same, a planetary gear on the extension adapted to serve as the prime mover of said mechanism, and means for retaining the said planetary gear in a variety of positions and for securing the extension unit to the machine, so as to permit a meshing of said adjustable gear on the machine and the planetary gear on the unit.

FRANK X. LAUTERBUR